(12) United States Patent
Song et al.

(10) Patent No.: US 11,165,716 B2
(45) Date of Patent: Nov. 2, 2021

(54) DATA FLOW PROCESSING METHOD AND DEVICE

(71) Applicant: Huawei Technologies Co., Ltd., Shenzhen (CN)

(72) Inventors: Wei Song, Nanjing (CN); Zhenwei Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 25 days.

(21) Appl. No.: 16/706,088

(22) Filed: Dec. 6, 2019

(65) Prior Publication Data
US 2020/0112523 A1 Apr. 9, 2020

Related U.S. Application Data

(63) Continuation of application No. PCT/CN2018/087216, filed on May 17, 2018.

(30) Foreign Application Priority Data

Jun. 6, 2017 (CN) .......................... 201710418829.7

(51) Int. Cl.
*H04L 12/927* (2013.01)
*G06F 9/455* (2018.01)
(Continued)

(52) U.S. Cl.
CPC ........ *H04L 47/805* (2013.01); *G06F 9/45558* (2013.01); *H04L 47/2475* (2013.01);
(Continued)

(58) Field of Classification Search
CPC ....... G06F 2009/45595; G06F 9/45558; H04L 47/24; H04L 47/2458; H04L 47/2475;
(Continued)

(56) References Cited

U.S. PATENT DOCUMENTS

| 7,774,498 B1 | 8/2010 | Kraemer et al. | |
| 8,761,095 B1 * | 6/2014 | O'Brien | H04W 28/24 370/329 |

(Continued)

FOREIGN PATENT DOCUMENTS

| CN | 101841456 A | 9/2010 |
| CN | 102594774 A | 7/2012 |

(Continued)

OTHER PUBLICATIONS

Curtis, A., "Mahout: Low-Overhead Datacenter Traffic Management using End-Host-Based Elephant Detection," XP031953345, IEEE INFOCOM 2011, 10 pages.

*Primary Examiner* — Robert J Lopata
(74) *Attorney, Agent, or Firm* — Conley Rose, P.C.

(57) ABSTRACT

This application provide a data flow processing method and a device. A host determines a priority corresponding to a first data flow to be sent to a switch, and adds the priority to the first data flow to generate a second data flow that includes the priority. The host sends the second data flow to the switch, so that the switch processes the second data flow according to the priority of the second data flow. A host assigns a priority to a data flow, and the switch does not need to determine whether the data flow is an elephant flow or a mouse flow, thereby saving hardware resources of the switch. The switch does not need to determine the priority of the data flow, thereby processing the data flow in a timely manner.

20 Claims, 11 Drawing Sheets

(51) Int. Cl.
    *H04L 12/859*         (2013.01)
    *H04L 12/865*         (2013.01)
    *H04L 12/931*         (2013.01)

(52) U.S. Cl.
    CPC .......... *H04L 47/6275* (2013.01); *H04L 49/70* (2013.01); *G06F 2009/45595* (2013.01)

(58) Field of Classification Search
    CPC ............. H04L 47/2483; H04L 47/6275; H04L 47/805; H04L 49/70; Y02D 30/00
    USPC .......................................................... 370/229
    See application file for complete search history.

(56) References Cited

U.S. PATENT DOCUMENTS

| | | | | |
|---|---|---|---|---|
| 9,124,515 | B2 | 9/2015 | Curtis et al. | |
| 10,044,604 | B1* | 8/2018 | Burns | H04L 47/12 |
| 10,116,588 | B2* | 10/2018 | Chang | H04L 49/30 |
| 2002/0031089 | A1* | 3/2002 | Elloumi | H04L 47/24 |
| | | | | 370/235 |
| 2002/0141339 | A1* | 10/2002 | Konuma | H04L 29/06 |
| | | | | 370/229 |
| 2009/0122699 | A1* | 5/2009 | Alperovitch | H04L 45/00 |
| | | | | 370/230 |
| 2010/0067489 | A1* | 3/2010 | Pelletier | H04L 69/22 |
| | | | | 370/331 |
| 2011/0228781 | A1* | 9/2011 | Izenberg | H04L 47/33 |
| | | | | 370/392 |
| 2011/0305147 | A1* | 12/2011 | Xu | H04L 47/2433 |
| | | | | 370/252 |
| 2012/0096193 | A1* | 4/2012 | Anzai | H04L 12/4641 |
| | | | | 710/20 |
| 2013/0058320 | A1* | 3/2013 | Motonami | H04W 28/22 |
| | | | | 370/338 |
| 2013/0163423 | A1* | 6/2013 | Cayeux | H04L 65/80 |
| | | | | 370/231 |
| 2014/0237118 | A1 | 8/2014 | Matthews | |
| 2015/0200866 | A1 | 7/2015 | Pope et al. | |
| 2015/0350063 | A1* | 12/2015 | Stokking | H04L 41/5022 |
| | | | | 370/254 |
| 2016/0173384 | A1 | 6/2016 | Zhu | |
| 2016/0315875 | A1* | 10/2016 | Chang | H04L 49/351 |
| 2016/0373361 | A1* | 12/2016 | Dhanabalan | H04L 47/24 |
| 2017/0034063 | A1* | 2/2017 | Mozolewski | H04L 47/28 |
| 2017/0177406 | A1* | 6/2017 | Chen | G06F 9/4831 |
| 2017/0346857 | A1* | 11/2017 | Porras | H04L 63/20 |
| 2018/0048576 | A1 | 2/2018 | Xu et al. | |
| 2018/0097723 | A1* | 4/2018 | Chinthalapati | H04L 45/38 |
| 2018/0152386 | A1* | 5/2018 | Chen | H04L 47/2441 |
| 2018/0191515 | A1* | 7/2018 | Vivekanandan | H04L 12/1881 |
| 2018/0198732 | A1* | 7/2018 | Karthikeyan | H04L 67/322 |
| 2018/0198838 | A1* | 7/2018 | Murgia | H04L 47/2433 |
| 2018/0349212 | A1* | 12/2018 | Liu | G06F 9/546 |
| 2019/0342785 | A1* | 11/2019 | Li | H04W 28/0263 |

FOREIGN PATENT DOCUMENTS

| | | |
|---|---|---|
| CN | 103634228 A | 3/2014 |
| CN | 106161283 A | 11/2016 |
| CN | 106209675 A | 12/2016 |

\* cited by examiner

DATA FLOW PROCESSING METHOD AND DEVICE

CROSS-REFERENCE TO RELATED APPLICATIONS

This application is a continuation of International Application No. PCT/CN2018/087216, filed on May 17, 2018, which claims priority to Chinese Patent Application No. 201710418829.7, filed on Jun. 6, 2017. The disclosures of the aforementioned applications are hereby incorporated by reference in their entireties.

TECHNICAL FIELD

This application relates to data transmission technologies, and in particular, to a data flow processing method and a device.

BACKGROUND

Currently, data flows in a computer network are classified into a mouse flow and an elephant flow. The elephant flow is a large-capacity (a total quantity of bits) continuous data flow set up over a network link, and the elephant flow may be generated, for example, due to data backup or virtual machine migration. The mouse flow is a small-capacity (a total quantity of bits) data flow set up over a network link. The mouse flow may be, for example, transactional traffic, a data flow generated during World Wide Web (WWW) browsing, or a data flow generated during searching and querying. Currently, both the elephant flow and the mouse flow exist on a data center network (EDCN), that is, when data is transmitted on the data center network, both the elephant flow and the mouse flow need to be transmitted. In this case, the elephant flow usually occupies bandwidth of the mouse flow, thereby affecting performance of the mouse flow. However, because the elephant flow has a relatively large data amount, even if the elephant flow occupies the bandwidth of the mouse flow, performance of the elephant flow is not significantly improved.

To ensure transmission performance of the elephant flow and the mouse flow, after receiving data flows to be transmitted, a switch needs to distinguish between an elephant flow and a mouse flow, and then assign different priorities to the mouse flow and the elephant flow. In addition, a priority of the mouse flow is higher than a priority of the elephant flow. Further, the switch first transmits the mouse flow with a higher priority and then transmits the elephant flow with a lower priority, so as to ensure that the mouse flow can be transmitted in a timely manner, and basically the performance of the elephant flow is not affected.

However, in this solution, the switch needs to collect flow-based statistics about packets before the switch can determine the elephant flow and the mouse flow. In this case, a flow table needs to be added to the switch, thereby consuming many hardware resources of the switch. In addition, because the switch determines whether a data flow is an elephant flow or a mouse flow in a data flow transmission process, when the switch determines that the data flow is an elephant flow, some data of the elephant flow has been transmitted, that is, this solution further has a problem that determining whether a data flow is an elephant flow or a mouse flow is not completed in time. As a result, the elephant flow has occupied the bandwidth of the mouse flow, and the mouse flow is affected.

SUMMARY

This application provides a data flow processing method and a device to resolve a problem in the prior art that in a case of determining whether a data flow is an elephant flow or a mouse flow, many hardware resources of a switch are consumed and the determining is not completed in time.

According to a first aspect, this application provides a data flow processing method, including: determining, by a host, a priority corresponding to a first data flow to be sent to a switch; adding, by the host, the priority to the first data flow to generate a second data flow that includes the priority; and sending, by the host, the second data flow to the switch, so that the switch processes the second data flow according to the priority of the second data flow.

In a possible design, the determining, by a host, a priority corresponding to a first data flow to be sent to a switch includes: determining, by the host, an application layer port corresponding to the first data flow; and determining, by the host according to a priority correspondence table, a priority corresponding to the application layer port.

In a possible design, before the determining, by a host, a priority corresponding to a first data flow to be sent to a switch, the method further includes: obtaining, by the host, a historical data flow that is corresponding to each application layer port and that is recorded by the host; and determining, by the host based on the historical data flow corresponding to the application layer port, a priority corresponding to each application layer port, and generating the priority correspondence table.

In a possible design, before the obtaining, by the host, a historical data flow that is corresponding to each application layer port and that is recorded by the host, the method further includes: receiving, by the host, a priority list sent by the switch, where the priority list includes priority values respectively corresponding to different priorities in a one-to-one corresponding manner and supported by the switch; and correspondingly, the adding, by the host, the priority to the first data flow includes: determining, by the host according to the priority list, a priority value of the priority corresponding to the application layer port; and adding, by the host, the priority value of the priority corresponding to the application layer port to the first data flow.

In a possible design, the receiving, by the host, a priority list sent by the switch includes: receiving, by the host, an extended Link Layer Discovery Protocol (LLDP) packet sent by the switch, where the extended LLDP packet includes at least two differentiated service code point (DSCP) values supported by the switch, and the at least two DSCP values are respectively corresponding to different priorities in a one-to-one corresponding manner.

In a possible design, the determining, by the host based on the historical data flow corresponding to the application layer port, a priority corresponding to each application layer port includes: determining, by the host for each application layer port, a sum of historical data flows corresponding to the application layer port; sorting, by the host, all application layer ports in descending order according to sizes of the sums of the historical data flows of all the application layer ports, to obtain an application layer port sequence; and determining, by the host, that a priority corresponding to the first N application layer ports in the application layer port sequence is a first level, and determining that a priority corresponding to application layer ports in the application layer port sequence other than the first N application layer ports is a second level, where the second level is higher than the first level and N is a positive integer.

According to a second aspect, this application provides a data flow processing method, including: receiving, by a switch, a second data flow sent by a host, where the second data flow is generated after the host determines a priority corresponding to a first data flow to be sent to the switch and adds the priority to the first data flow; and processing, by the switch, the second data flow according to the priority of the second data flow.

In a possible design, before the receiving, by a switch, a second data flow sent by a host, the method further includes: sending, by the switch, a priority list to the host, where the priority list includes priority values respectively corresponding to different priorities in a one-to-one corresponding manner and supported by the switch.

In a possible design, the sending, by the switch, a priority list to the host includes: sending, by the switch, an extended LLDP packet to the host, where the extended LLDP packet includes at least two DSCP values supported by the switch, and the at least two DSCP values are respectively corresponding to different priorities in a one-to-one corresponding manner.

In a possible design, the processing, by the switch, the second data flow according to the priority of the second data flow includes: placing, by the switch according to the priority of the second data flow, the second data flow into a data queue corresponding to the priority.

According to a third aspect, this application provides a host, including: a determining module, configured to determine a priority corresponding to a first data flow to be sent to a switch; a generation module, configured to add the priority to the first data flow to generate a second data flow that includes the priority; and a sending module, configured to send the second data flow to the switch, so that the switch processes the second data flow according to the priority of the second data flow.

In a possible design, the determining module is specifically configured to: determine an application layer port corresponding to the first data flow; and determine, according to a priority correspondence table, a priority corresponding to the application layer port.

In a possible design, the host further includes: an obtaining module, configured to: before the determining module determines the priority corresponding to the data flow to be sent to the switch, obtain a historical data flow that is corresponding to each application layer port and that is recorded by the host; and an analysis module, configured to: determine, based on the historical data flow corresponding to each application layer port, a priority corresponding to the application layer port, and generate the priority correspondence table.

In a possible design, the host further includes: a receiving module, configured to: before the obtaining module obtains the historical data flow that is corresponding to each application layer port and that is recorded by the host, receive a priority list sent by the switch, where the priority list includes priority values respectively corresponding to different priorities in a one-to-one corresponding manner and supported by the switch; and correspondingly, the generation module is specifically configured to: determine, according to the priority list, a priority value of the priority corresponding to the application layer port; and add the priority value of the priority corresponding to the application layer port to the first data flow.

In a possible design, the receiving module is specifically configured to: receive an extended LLDP packet sent by the switch, where the extended LLDP packet includes at least two DSCP values supported by the switch, and the at least two DSCP values are respectively corresponding to different priorities in a one-to-one corresponding manner.

In a possible design, the analysis module is specifically configured to: determine, for each application layer port, a sum of historical data flows corresponding to the application layer port; sort all application layer ports in descending order according to sizes of the sums of the historical data flows of all the application layer ports, to obtain an application layer port sequence; and determine that a priority corresponding to the first N application layer ports in the application layer port sequence is a first level, and determine that a priority corresponding to application layer ports in the application layer port sequence other than the first N application layer ports is a second level, where the second level is higher than the first level and N is a positive integer.

According to a fourth aspect, this application provides a switch, including: a receiving module, configured to receive a second data flow sent by a host, where the second data flow is generated after the host determines a priority corresponding to a first data flow to be sent to the switch and adds the priority to the first data flow; and a processing module, configured to process the second data flow according to the priority of the second data flow.

In a possible design, the switch further includes: a sending module, configured to send a priority list to the host before the receiving module receives the second data flow sent by the host, where the priority list includes priority values respectively corresponding to different priorities in a one-to-one corresponding manner and supported by the switch.

In a possible design, the sending module is specifically configured to: send an extended LLDP packet to the host, where the extended LLDP packet includes at least two DSCP values supported by the switch, and the at least two DSCP values are respectively corresponding to different priorities in a one-to-one corresponding manner.

In a possible design, the processing module is specifically configured to: place, according to the priority of the second data flow, the second data flow into a data queue corresponding to the priority.

According to a fifth aspect, this application provides a computer program. The program is used to perform the method in the first aspect when being executed by a processor.

According to a sixth aspect, this application provides a computer program. The program is used to perform the method in the second aspect when being executed by a processor.

According to a seventh aspect, a computer program product that includes instructions is provided. When the computer program product is executed on a computer, the computer performs the methods in the foregoing aspects.

According to an eighth aspect, a computer-readable storage medium is provided, where the computer-readable storage medium stores instructions, and a computer performs the methods in the foregoing aspects when the instructions are executed on the computer.

It can be learned that in the foregoing aspects, the host determines the priority corresponding to the first data flow to be sent to the switch; the host adds the priority to the first data flow to generate the second data flow that includes the priority; and the host sends the second data flow to the switch, so that the switch processes the second data flow according to the priority of the second data flow. The host is a server in a non-virtualization scenario, and the host is a virtual machine in a virtualization scenario. Therefore, before the server or the virtual machine sends a data flow to the switch, the server or the virtual machine assigns a priority to the data flow, so that the switch does not need to collect flow-based statistics on packets to determine whether the data flow is an elephant flow or a mouse flow, and hardware resources of the switch can be saved. In addition, because the server or the virtual machine sends the data flow configured with the priority to the switch, the switch may directly process, for example, transmit or discard, the data flow in a priority order represented by the priority in the data flow, and the switch does not need to determine the priority of the data flow, thereby preventing the elephant flow from occupying bandwidth of the mouse flow, and processing the mouse flow in a timely manner.

DESCRIPTION OF EMBODIMENTS

Embodiments of this application are applied to various types of communications systems or another system that may occur in the future.

Figure 1:
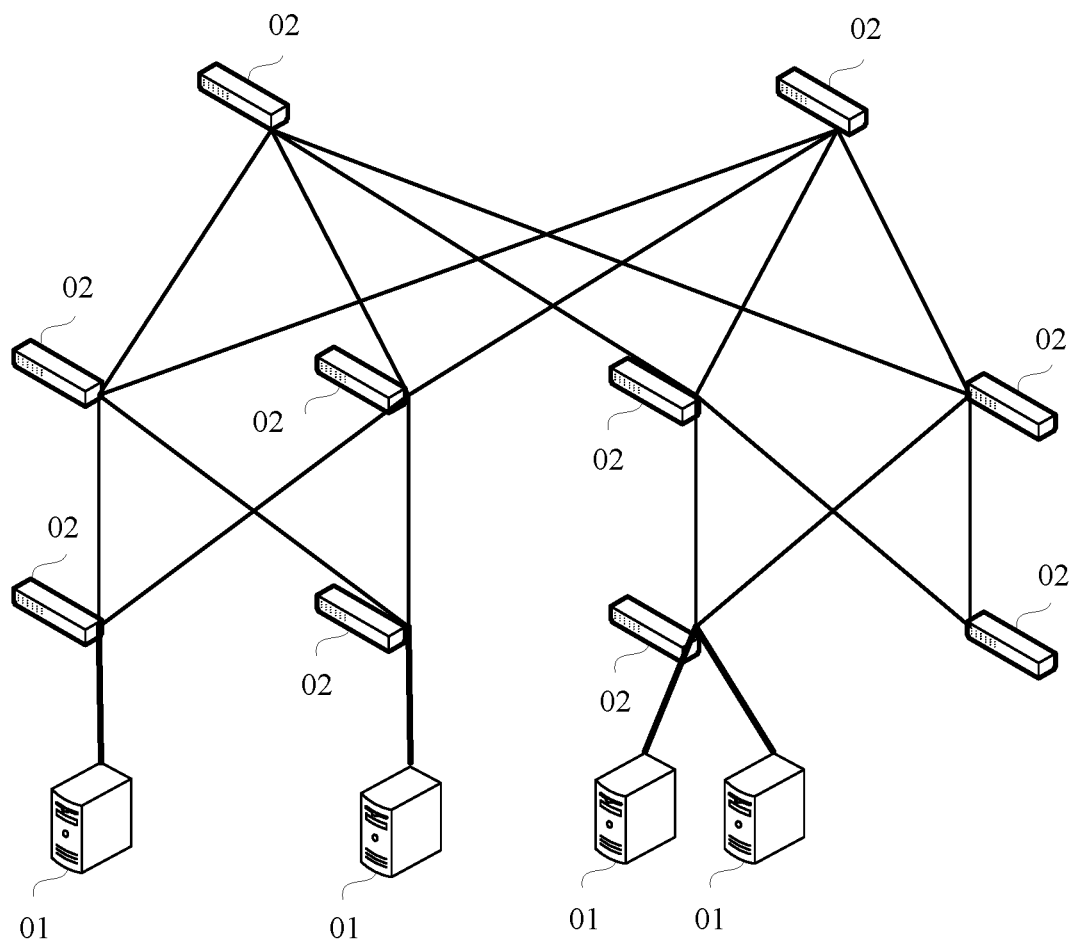
FIG. 1 is a schematic diagram 1 of an application scenario according to an embodiment of this application.

FIG. 1 is a schematic diagram 1 of an application scenario according to an embodiment of this application. A networking architecture shown in FIG. 1 mainly includes a host 01 and a switch 02. The host 01 may be a server or a virtual machine deployed on the server. FIG. 1 provides typical networking of a data center network. The networking is usually networking of one region, such as a region A, or a region B. The networking may include a multilayer architecture, such as a three-layer architecture or a two-layer architecture, and a specific layer quantity depends on a scale of the data center network. In the data center network, quality of service (QoS) policies are the same, that is, a same QoS policy is configured on all switches in a same data center network.

The QoS policy is described herein. When network congestion occurs, all data flows that are being transmitted on the network may be discarded. In this case, to meet different service quality requirements of a user for different applications, a network is required to allocate and schedule resources for different applications according to the requirements of the user, that is, provide different service quality for different data flows. For example, an important data flow with a high real-time requirement is preferably processed. However, for an ordinary data flow with a low real-time requirement, a lower processing priority is provided, and a packet of the ordinary data flow is preferably discarded in a case of network congestion. Such a processing method is one QoS policy. In conclusion, the QoS policy means assigning different levels of transmission priorities to different types of data flows, further identifying relative importance of different types of data flows, and providing differentiated transmission services for the data flows based on mechanisms provided by a network device, such as various priority forwarding policies and congestion avoidance.

Currently, an elephant flow that requires large bandwidth but does not have a strict time constraint occupies about 80% of total traffic in the data center network (DCN). In contrast, usually a mouse flow is very latency-sensitive due to a short service life, and the mouse flow has a deadline constraint that is ultimately defined by a service level agreement (SLA) between a cloud provider and a customer. Because a latency of the mouse flow significantly affects user experience, special processing is required for the mouse flow. Currently, different priorities are usually assigned to the mouse flow and the elephant flow, and a priority of the mouse flow is higher than a priority of the elephant flow.

However, in the prior art, to achieve a flow-based statistics feature, a flow table needs to be deployed on the switch. When the switch processes many data flows, the flow table occupies many hardware resources of the switch. Because the switch determines, in a data transmission process, whether a data flow is an elephant flow or a mouse flow, when the switch determines that the data flow is an elephant flow, some data of the elephant flow has been transmitted, that is, whether a data flow is an elephant flow or a mouse flow cannot be determined in time in the identifying method. As a result, the elephant flow has occupied bandwidth of the mouse flow, and the mouse flow is affected.

Figure 2:
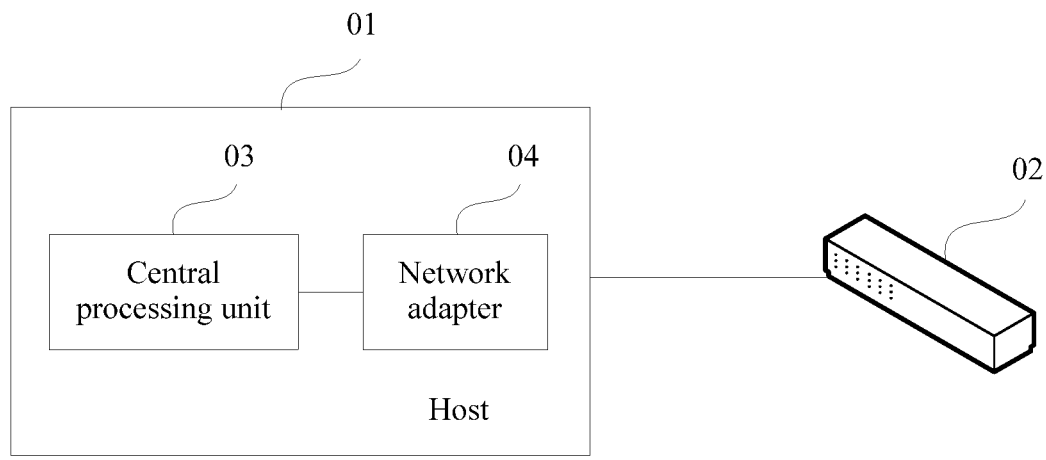
FIG. 2 is a schematic diagram 2 of an application scenario according to an embodiment of this application.

FIG. 2 is a schematic diagram 2 of an application scenario according to an embodiment of this application. The scenario shown in FIG. 2 mainly includes a host 01 and a switch 02. In the scenario shown in FIG. 2, connections between devices in a non-virtualization scenario are provided. Specifically, the host 01 includes a central processing unit 03 and a network adapter 04, and the switch 02 communicates with the central processing unit 03 by using the network adapter 04.

Figure 3:
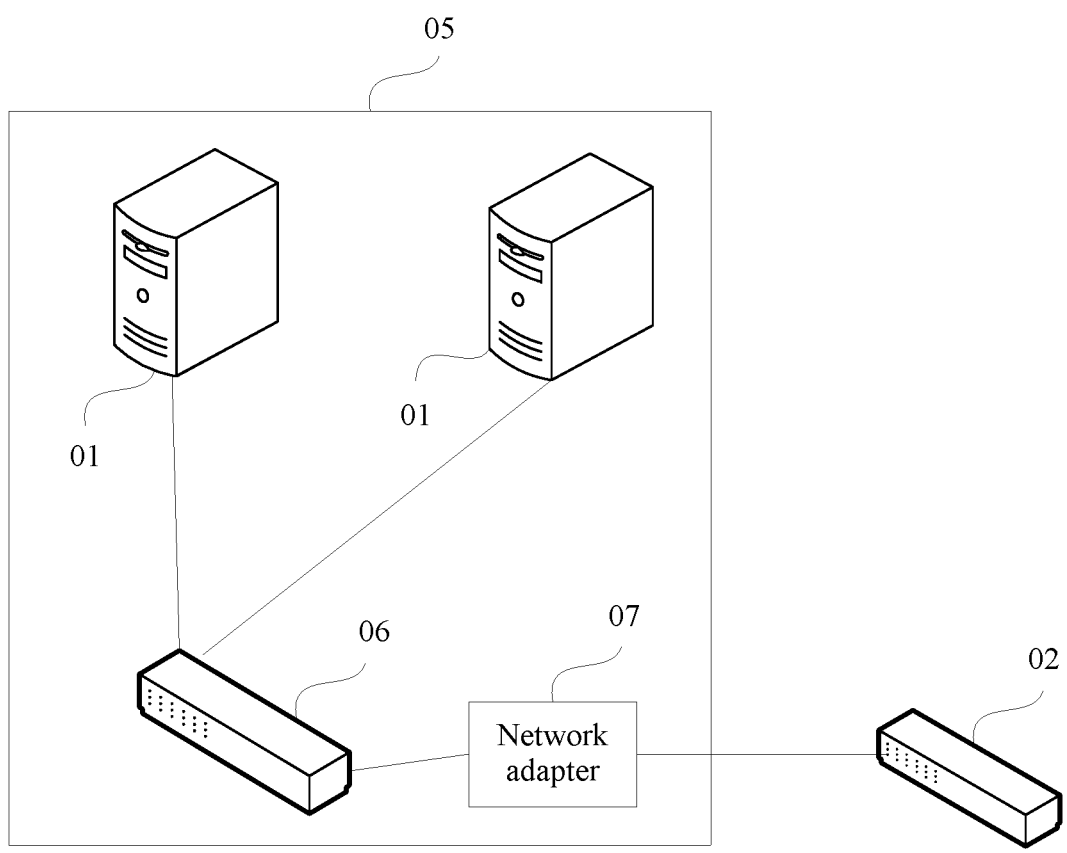
FIG. 3 is a schematic diagram 3 of an application scenario according to an embodiment of this application.

FIG. 3 is a schematic diagram 3 of an application scenario according to an embodiment of this application. The scenario shown in FIG. 3 mainly includes a host 01, a switch 02, and a virtual switch 06. In the scenario shown in FIG. 3, connections between devices in a virtualization scenario are provided. The host 01 is a virtual machine, and the switch 02 is a switch. Specifically, one network adapter 07, one virtual switch 06, and at least one host 01 are disposed in a physical host 05. The network adapter 07 communicates with the virtual switch 06. In addition, each host 01 communicates with the virtual switch 06, and the switch 02 communicates with the virtual switch 06 by using the network adapter 07.

Figure 4:
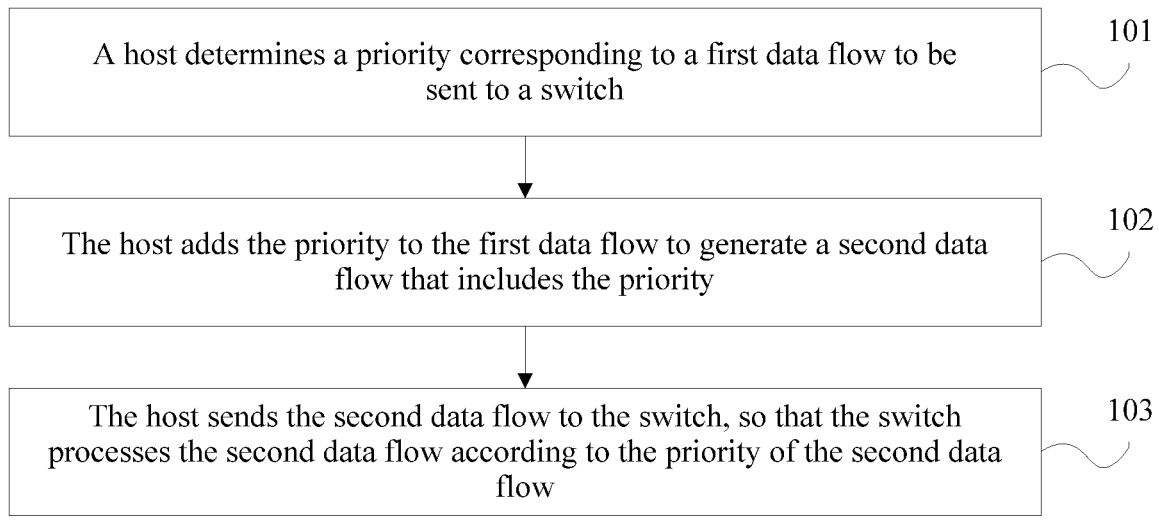
FIG. 4 is a schematic flowchart of a data flow processing method according to an embodiment of this application.

FIG. 4 is a schematic flowchart of a data flow processing method according to an embodiment of this application. As shown in FIG. 4, the method includes the following steps.

S101. A host determines a priority corresponding to a first data flow to be sent to a switch.

In this embodiment, the host is a server or a virtual machine. This embodiment is executed by the host.

First, in the non-virtualization scenario shown in FIG. 2, the host is a server. When the server needs to send the first data flow to the switch, the server needs to determine the priority corresponding to the first data flow.

S102. The host adds the priority to the first data flow to generate a second data flow that includes the priority.

In this embodiment, in the non-virtualization scenario shown in FIG. 2, the server adds the determined priority to the first data flow to generate the second data flow, and the second data flow carries the priority of the first data flow.

For the switch and the host, the first data flow and the second data flow are essentially a same data flow because they have a same quintuple. In this application, only for the purpose of convenient description, the data flow before the priority is added is referred to as the first data flow, and the data flow after the priority is added is referred to as the second data flow.

S103. The host sends the second data flow to the switch, so that the switch processes the second data flow according to the priority of the second data flow.

In this embodiment, in the non-virtualization scenario shown in FIG. 2, the server sends the second data flow to the switch. Because the second data flow received by the switch is configured with the priority, then the switch may process, for example, transmit or discard, the second data flow in a priority order represented by the priority in the second data flow.

In the foregoing steps, in the virtualization scenario shown in FIG. 3, the host is a virtual machine. When the virtual machine needs to send the first data flow to the switch, the virtual machine needs to determine the priority corresponding to the first data flow. The virtual machine adds the determined priority to the first data flow to generate the second data flow. The virtual machine then sends the second data flow to the switch by using a virtual switch, so that the second data flow received by the switch includes the priority, and then the switch can process, for example, transmit or discard, the second data flow in a priority order represented by the priority of the second data flow.

Figure 5:
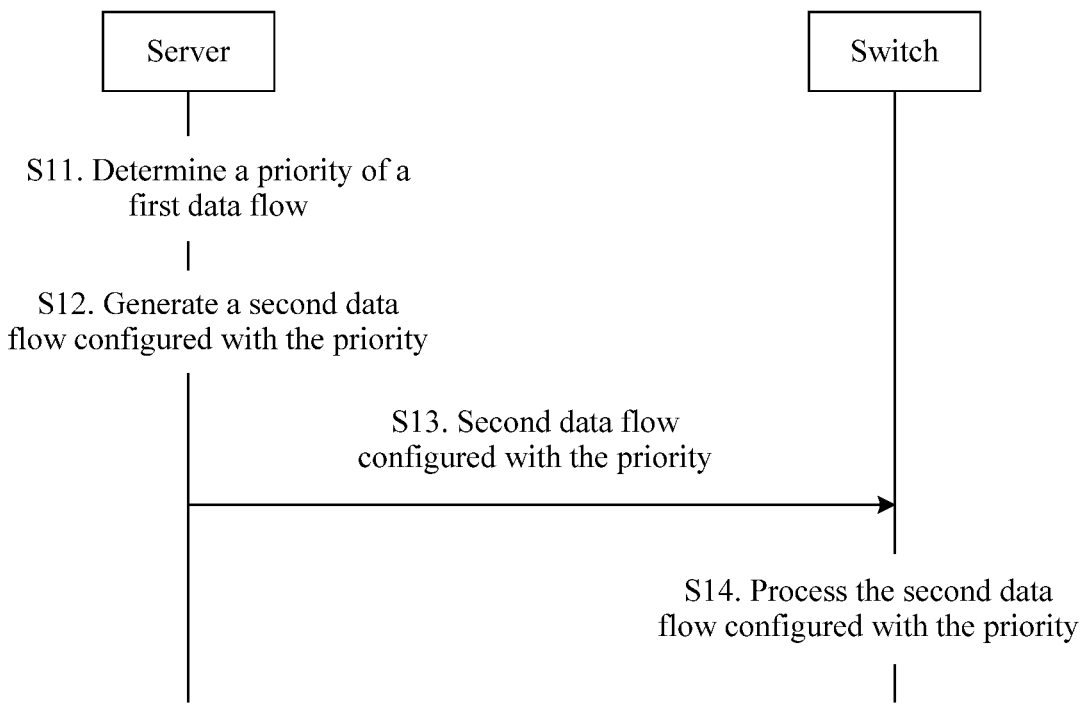
FIG. 5 is a signaling diagram 1 of a data flow processing method according to an embodiment of this application.

FIG. 5 is a signaling diagram 1 of a data flow processing method according to an embodiment of this application. FIG. 5 is used to perform the procedure in the non-virtualization scenario in the data flow processing method provided in FIG. 4. As shown in FIG. 5, the method includes the following steps:

S11. A server determines a priority corresponding to a first data flow to be sent to a switch.

S12. The server adds the priority to the first data flow to generate a second data flow.

S13. The server sends the second data flow to the switch.

S14. The switch processes the second data flow according to the priority of the second data flow.

For a process shown in FIG. 5, refer to the process shown in FIG. 4. The server in FIG. 5 is the host in FIG. 4.

Figure 6:
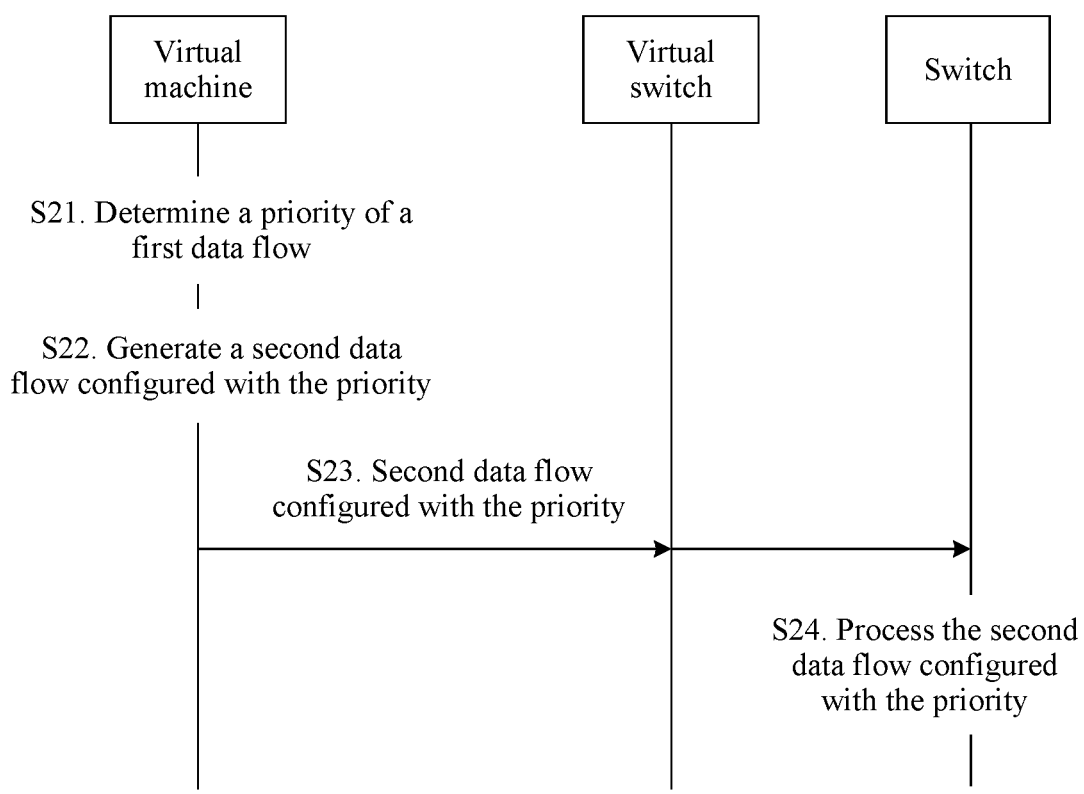
FIG. 6 is a signaling diagram 2 of a data flow processing method according to an embodiment of this application.

FIG. 6 is a signaling diagram 2 of a data flow processing method according to an embodiment of this application. FIG. 6 is used to perform the procedure in the virtualization scenario in the data flow processing method provided in FIG. 4. As shown in FIG. 6, the method includes the following steps:

S21. A virtual machine determines a priority corresponding to a first data flow to be sent to a switch.

S22. The virtual machine adds the determined priority to the first data flow to generate a second data flow.

S23. The virtual machine sends the second data flow to the switch by using a virtual switch.

S24. The switch processes the second data flow in a priority order represented by the priority of the second data flow.

For a process shown in FIG. 6, refer to the process shown in FIG. 4.

In this embodiment, the host determines the priority corresponding to the first data flow to be sent to the switch; the host adds the priority to the first data flow to generate the second data flow that includes the priority; and the host sends the second data flow to the switch, so that the switch processes the second data flow according to the priority of the second data flow. The host is a server in the non-virtualization scenario, and the host is a virtual machine in the virtualization scenario. Therefore, before the server or the virtual machine sends the data flow to the switch, the server or the virtual machine assigns a priority to the data flow, so that the switch does not need to collect flow-based statistics about packets to determine whether the data flow is an elephant flow or a mouse flow, and hardware resources of the switch can be saved. In addition, because the server or the virtual machine sends the data flow configured with the priority to the switch, the switch may process, for example, transmit, the data flow in the priority order represented by the priority in the data flow, and then the switch does not need to determine the priority of the data flow, thereby preventing the elephant flow from occupying bandwidth of the mouse flow, and processing the data flow in a timely manner.

Figure 7:
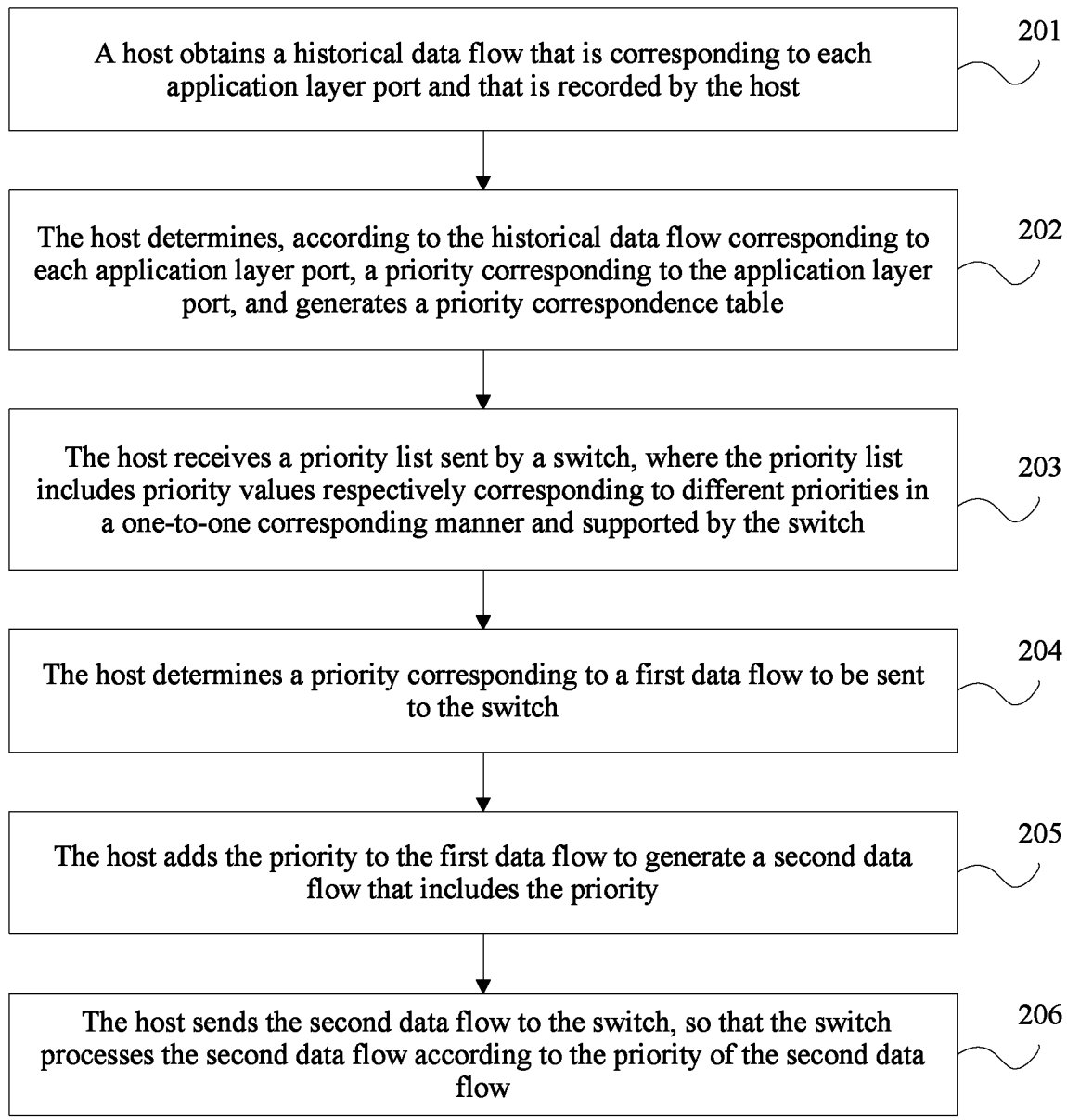
FIG. 7 is a schematic flowchart of another data flow processing method according to an embodiment of this application.

FIG. 7 is a schematic flowchart of another data flow processing method according to an embodiment of this application. As shown in FIG. 7, the method includes the following steps.

S201. A host obtains a historical data flow that is corresponding to each application layer port and that is recorded by the host.

This embodiment is executed by the host, and the host is a server or a virtual machine.

For a same server or virtual machine, a same application layer port means a same service. For example, a File Transfer Protocol (FTP) service, a Hypertext Transfer Protocol (HTTP) service, and a database service separately have fixed application layer ports. To be specific, on the same server or virtual machine, the same application layer port has a similar data flow behavior. In this application, an application layer port refers to an application layer port number. Different protocols at an application layer have different application layer port numbers. Then, on a physical host or a server, if an application layer port presents an elephant flow behavior in historical data transmission, the application layer port is also likely to present the elephant flow behavior in the future. Based on this principle, in this solution, processes in S201 and S202 are used to determine a priority of the data flow, and then determine an elephant flow and a mouse flow.

First, in the non-virtualization scenario shown in FIG. 2, the host is a server. The server can obtain the historical data flow that is corresponding to each application layer port and that is recorded by the current server.

S202. The host determines, based on the historical data flow corresponding to each application layer port, a priority corresponding to the application layer port, and generates a priority correspondence table.

The priority correspondence table is used to record the priority corresponding to each application layer port.

Determining the priority corresponding to each application layer port specifically includes the following:

The host determines, for each application layer port, a sum of historical data flows corresponding to the application layer port; the host sorts all application layer ports in descending order according to sizes of the sums of the data flows of all the application layer ports, to obtain an application layer port sequence; and the host determines that a priority corresponding to the first N application layer ports in the application layer port sequence is a first level, and determines that a priority corresponding to application layer ports in the application layer port sequence other than the first N application layer ports is a second level, where the second level is higher than the first level, and N is a positive integer.

In this embodiment, in the non-virtualization scenario shown in FIG. 2, the host is a server. The server may analyze the historical data flow corresponding to each application layer port to determine the priority corresponding to each application layer port, where the priority of each application layer port represents a correspondence between an application layer port and a priority of a data flow, that is, a priority of a data flow that flows through each application layer port is determined. Then, the server generates a priority correspondence table that includes the priority of each application layer port. Specifically, the server needs to collect, for each application layer port, the sum of the historical data flows corresponding to each application layer port. Then, the server sorts all the application layer ports in descending order according to the sizes of the sums of the data flows of all the application layer ports, so as to obtain the application layer port sequence. Finally, the server may determine that the priority corresponding to the first N application layer ports in the application layer port sequence is the first level. In addition, the server may determine that the priority corresponding to the application layer ports in the application layer port sequence other than the first N application layer ports is the second level, where the second level is higher than the first level, and a value of N is a positive integer. For example, the server may determine that the priority corresponding to the first N application layer ports in the application layer port sequence is an elephant flow level, and may determine that the priority corresponding to the application layer ports in the application layer port sequence other than the first N application layer ports is a mouse flow level. In addition, the server determines that a priority of the mouse flow level is higher than a priority of the elephant flow level.

For example, the server collects statistics about 10000 data flows that occurred on the server, and the server needs to determine, for each application layer port, a sum of historical data flows of the application layer port. The server then sorts all the application layer ports in descending order according to sizes of the sums of the data flows of all the application layer ports, as shown in the application layer port sequence in Table 1, to obtain a sequence of application layer ports with different application layer port numbers keys. A UDP/TCP port represents a source application layer port/a destination application layer port. The server determines that a priority corresponding to the top 10% application layer ports is the elephant flow level, and a priority corresponding to remaining application layer ports is the mouse flow level. In addition, the server determines that the priority of the mouse flow level is higher than the priority of the elephant flow level.

TABLE 1

| Application layer port sequence | |
|---|---|
| Application layer port number key (UDP/TCP port) | Sum of data flows (Bytes) |
| 50010 | 1024M |
| 53762 | 824M |
| 21 | 624M |
| ... | ... |

S203. The host receives a priority list sent by a switch, where the priority list includes priority values respectively corresponding to different priorities in a one-to-one corresponding manner and supported by the switch.

Specifically, S203 includes the following: The host receives an extended LLDP packet sent by the switch.

The extended LLDP packet includes a Link Layer Discovery Protocol data unit (LLDPDU), the LLDPDU includes an optional type/length/value (TLV), the optional TLV includes an information table, and the information table includes a type identifier of the optional TLV, a name of the optional TLV, and at least two DSCP values supported by the switch, where the DSCP values are respectively corresponding to different priorities in a one-to-one corresponding manner.

In this embodiment, in the non-virtualization scenario shown in FIG. 2, the host is a server, and the switch needs to send a priority list to the server, where the priority list includes priority values respectively corresponding to different priorities in a one-to-one corresponding manner and supported by the switch.

Specifically, the LLDP is first described. Nowadays, because a variety of network devices exist and configuration is complex, a standard information exchange platform needs to be set, so that network devices from different vendors can discover each other and exchange respective system and configuration information in a network. Then, the LLDP is provided. The LLDP provides a standard link layer discovery manner. The LLDP means that the network device organizes information such as primary capability information, a management address, a device identifier, and an interface identifier of the network device into different TLVs and encapsulates the TLVs into an LLDPDU. The current network device then advertises an LLDP packet carrying the LLDPDU to a neighbor network device directly connected to the current network device. After the neighbor network device receives the information, the neighbor network device saves the information in a form of a standard management information base (MIB), so that a network management system can query and determine a link communication status.

There is an idle optional TLV in the LLDPDU in the LLDP packet. A TLV is a primary data format of the LLDPDU, and a format of a TLV data type is shown in Table 2.

TABLE 2

| Format of TLV data type | | |
|---|---|---|
| TLV type | Length of TLV data part | TLV data part |
| (7 bits) | (9 bits) | (0 bytes to 511 bytes) |

Among values of the TLV type, 127 and 0 to 8 are dedicated values specified in existing specifications, and 9 to 126 are reserved values, as shown in FIG. 3. In this application, the reserved values from 9 to 126 may be used to set up the optional TLV.

TABLE 3

Definition of TLV types

| TLV type (Type) | TLV name (Name) | Mandatory or not |
|---|---|---|
| 0 | End of LLDPDU | Mandatory |
| 1 | Chassis ID | Mandatory |
| 2 | Port ID | Mandatory |
| 3 | Time to live | Mandatory |

TABLE 3-continued

Definition of TLV types

| TLV type (Type) | TLV name (Name) | Mandatory or not |
|---|---|---|
| 4 | Port description | Optional |
| 5 | System name | Optional |
| 6 | System description | Optional |
| 7 | System capabilities | Optional |
| 8 | Management address | Optional |
| 9 to 126 | Reserved for future standardization | — |
| 127 | Organizationally specific TLVs | Optional |

In the non-virtualization scenario shown in FIG. 2, the switch adds an optional TLV to the LLDPDU of the LLDP packet, the optional TLV includes an information table, and then an extended LLDP packet is obtained. The information table includes a type identifier of the optional TLV, a name of the optional TLV, and at least two DSCP values supported by the switch, where the DSCP values are respectively corresponding to different priorities in a one-to-one corresponding manner. The DSCP values are priority values respectively corresponding to different priorities in a one-to-one corresponding manner. For example, Table 4 is an information table, and as shown in Table 4, the type identifier of the optional TLV is 125.

TABLE 4

Information table

| Type | Name | Content (DSCP value) |
|---|---|---|
| 125 | Support priority list | DSCP priorities that can be supported by the switch |

For a definition of the content in the information table of Table 4, refer to RFC 791 (requests for comments, RFC). In RFC 791, the first three bits of a type of service (TOS) field indicate IP precedence. The three bits can be used to indicate eight priorities, that is, IP priority fields. The three bits may be applied to flow classification, and a larger value indicates a higher priority. IP precedence may be used to mark eight types of services, and application types of IP precedence are as follows:

7 Reserved
6 Reserved
5 Voice
4 Video conference
3 Call signal
2 High-priority data
1 Medium-priority data
0 Best-effort service data In this way, the switch may obtain a new LLDP packet, for example, obtain an LLDP packet in Table 5, as shown in Table 5.

TABLE 5

| LLDP packet | | | | | | | |
|---|---|---|---|---|---|---|---|
| Destination MAC address | Source MAC address | Ether Type | Chassis ID TLV | Port ID TLV | Time To Live TLV | Optional TLV | End of LLDPDU TLV |
| Destination MAC | Source MAC | 0x88 cc | A | B | C | D | Indicate end of the LLDP |

The switch then sends the extended LLDP packet to the server, so that the server receives and saves the extended LLDP packet sent by the switch.

S204. The host determines a priority corresponding to a first data flow to be sent to the switch.

S204 specifically includes the following:

The host determines an application layer port corresponding to the first data flow; and the host determines, according to the priority correspondence table, a priority corresponding to the application layer port.

In this embodiment, in the non-virtualization scenario shown in FIG. 2, the host is a server. When the server needs to send the first data flow to the switch, the server may determine the current application layer port corresponding to the current first data flow to be sent. Then, because the priority correspondence table is determined in S202, and the priority correspondence table includes the priority of each application layer port, the server can determine the priority corresponding to the current application layer port.

S205. The host adds the priority to the first data flow to generate a second data flow that includes the priority.

S205 specifically includes the following:

The host determines, according to the priority list, a priority value of the priority corresponding to the application layer port; and the host adds the priority value of the priority corresponding to the application layer port to the first data flow.

In this embodiment, in the non-virtualization scenario shown in FIG. 2, because the server has received the extended LLDP packet sent by the switch in S203, the server can obtain information about the priority list included in the LLDPDU from the extended LLDP packet. The extended LLDP packet has priority values corresponding to different priorities, and the priority values herein are DSCP values, so that the server can determine the priority value of the priority corresponding to the current application layer port, that is, determine a DSCP value of the priority corresponding to the current application layer port. Then, the server can add the determined DSCP value of the priority corresponding to the current application layer port to the current first data flow, so as to generate a second data flow that includes the DSCP value. In this way, the server configures different DSCP values for first data flows corresponding to application layer ports with different priorities. A DSCP value of a data flow is corresponding to a priority of an application layer port. For example, a data flow that flows through an application layer port having an elephant flow feature is configured as an elephant flow, and a data flow that flows through an application layer port having a mouse flow feature is configured as a mouse flow. In addition, a priority of the mouse flow is higher than a priority of the elephant flow, so as to protect the mouse flow.

S206. The host sends the second data flow to the switch, so that the switch processes the second data flow according to the priority of the second data flow.

In this embodiment, in the non-virtualization scenario shown in FIG. 2, the host is a server, and the server sends the second data flow configured with the DSCP value to the switch. Then, a plurality of data queues are configured on the switch, and different data queues have different priorities, that is, the different data queues have different DSCP values. For example, a priority of a mouse flow data queue is set to 10, a weight of an elephant flow data queue is set to 1, and the priority of the mouse flow is higher than the priority of the elephant flow. Therefore, after the switch receives the second data flow configured with the DSCP value, the switch may place the second data flow into a data queue corresponding to the DSCP value according to the DSCP value in the second data flow. Then, the switch processes, for example, transmits or discards, data queues with different priorities. Therefore, after the switch receives the second data flow configured with the DSCP value, the switch does not need to mark the second data flow with a priority according to a QoS policy, or the switch does not need to identify the priority of the second data flow and does not need to process a mapping relationship between the second data flow and a priority of a data flow according to priorities on the server.

In the foregoing steps, in the virtualization scenario shown in FIG. 3, the host is a virtual machine. The virtual machine may obtain historical data flows corresponding to each application layer port on the current virtual machine. The virtual machine may analyze the historical data flows corresponding to each application layer port to determine a priority corresponding to each application layer port. The priority of each application layer port represents a correspondence between an application layer port and a priority of a data flow, that is, a priority of a data flow that flows through each application layer port is determined. Then, the virtual machine generates a priority correspondence table that includes the priority of each application layer port. The switch needs to send a priority list to a virtual switch by using a network adapter, and the priority list includes priority values respectively corresponding to different priorities in a one-to-one corresponding manner and supported by the switch. The priority list is an extended LLDP packet, the extended LLDP packet includes an LLDPDU, the LLDPDU includes an optional TLV, the optional TLV includes an information table, and the information table includes a type identifier of the optional TLV, a name of the optional TLV, and at least two DSCP values supported by the switch, where the DSCP values are respectively corresponding to different priorities in a one-to-one corresponding manner. The virtual switch then sends the extended LLDP packet to each virtual machine connected to the virtual switch. When the virtual machine needs to send the first data flow to the switch, the virtual machine may determine the current application layer port corresponding to the current first data flow to be sent. Then, because the virtual machine has determined the priority correspondence table that includes the priority of each application layer port, the virtual machine can determine the priority corresponding to the current application layer port. Then, the virtual machine can determine a priority value of the priority corresponding to the current application layer port, that is, determine a DSCP value of the priority corresponding to the current application layer port. Then, the virtual machine can add the determined DSCP value of the priority corresponding to the current application layer port to the first data flow, so as to generate a second data flow that includes the DSCP value. The virtual machine sends the second data flow configured with the DSCP value to the switch by sequentially using the virtual switch and the network adapter. The switch places the second data flow into a data queue corresponding to the DSCP value according to the DSCP value in the second data flow, and then the switch processes, for example, transmits or discards, data queues with different priorities.

Figure 8:
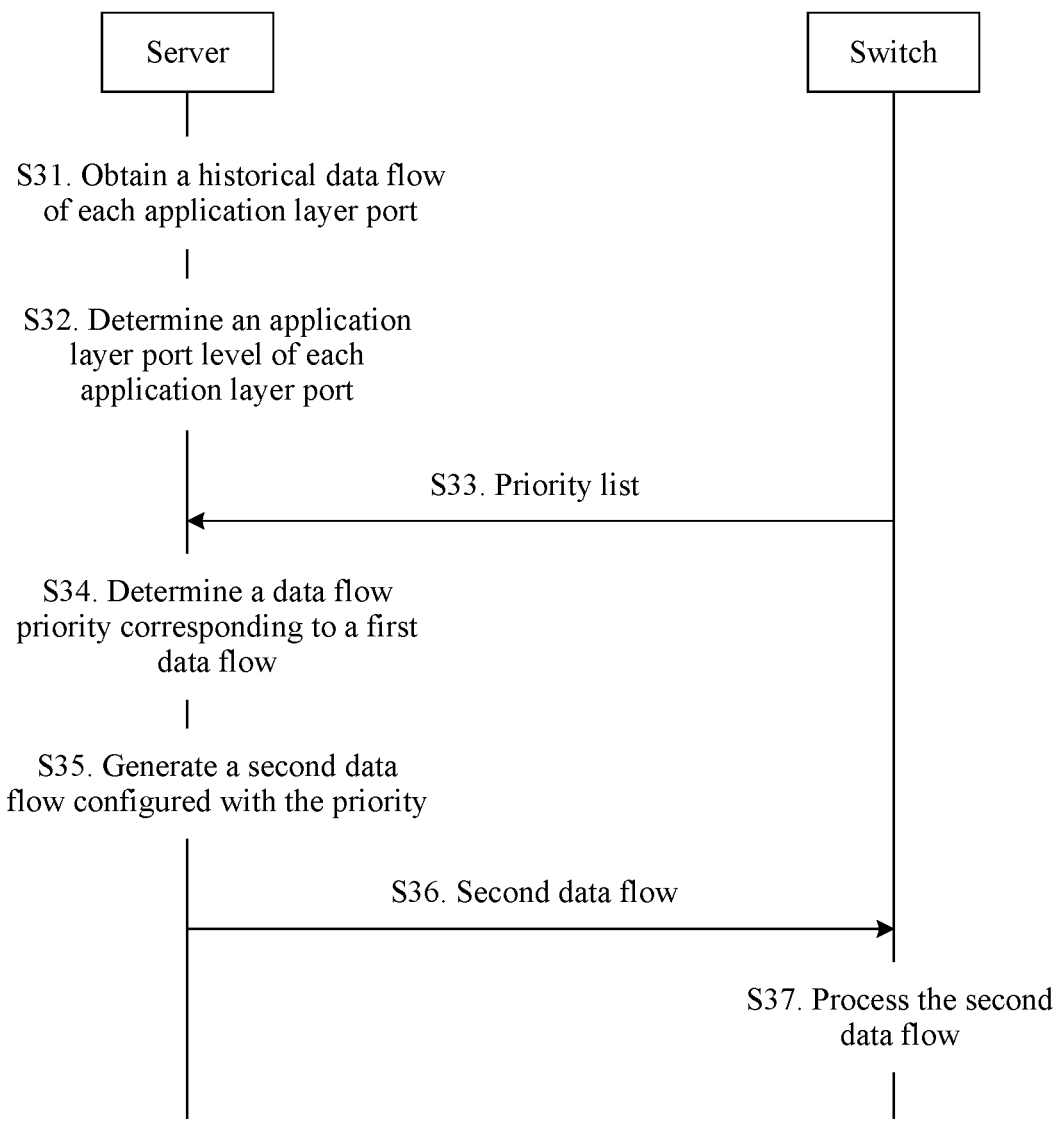
FIG. 8 is a signaling diagram 3 of a data flow processing method according to an embodiment of this application.

FIG. 8 is a signaling diagram 3 of a data flow processing method according to an embodiment of this application. FIG. 8 is used to perform the procedure in the non-virtualization scenario in the another data flow processing method provided in FIG. 7. As shown in FIG. 8, the method includes the following steps.

S31. A server obtains a historical data flow that is corresponding to each application layer port and that is recorded by the server.

S32. The server determines, based on the historical data flow corresponding to each application layer port, a priority corresponding to the application layer port, and generates a priority correspondence table.

S33. The server receives a priority list sent by a switch, where the priority list includes priority values respectively corresponding to different priorities in a one-to-one corresponding manner and supported by the switch.

S33 specifically includes the following: The server receives an extended LLDP packet sent by the switch, where the extended LLDP packet includes an LLDPDU, the LLDPDU includes an optional TLV, the optional TLV includes an information table, and the information table includes a type identifier of the optional TLV, a name of the optional TLV, and at least two DSCP values supported by the switch, where the DSCP values are respectively corresponding to different priorities in a one-to-one corresponding manner.

S34. The server determines a priority corresponding to a first data flow to be sent to the switch.

S35. The server adds the priority to the first data flow to generate a second data flow that includes the priority. S35 specifically includes the following:

The server determines, according to the priority list, a priority value of the priority corresponding to the application layer port; and the server adds the priority value of the priority corresponding to the application layer port to the first data flow, where the priority value may be specifically a DSCP value.

S36. The server sends the second data flow to the switch.

S37. The switch places, according to the priority of the second data flow, the second data flow into a data queue corresponding to the priority.

For a process shown in FIG. 8, refer to the process shown in FIG. 7.

Figure 9:
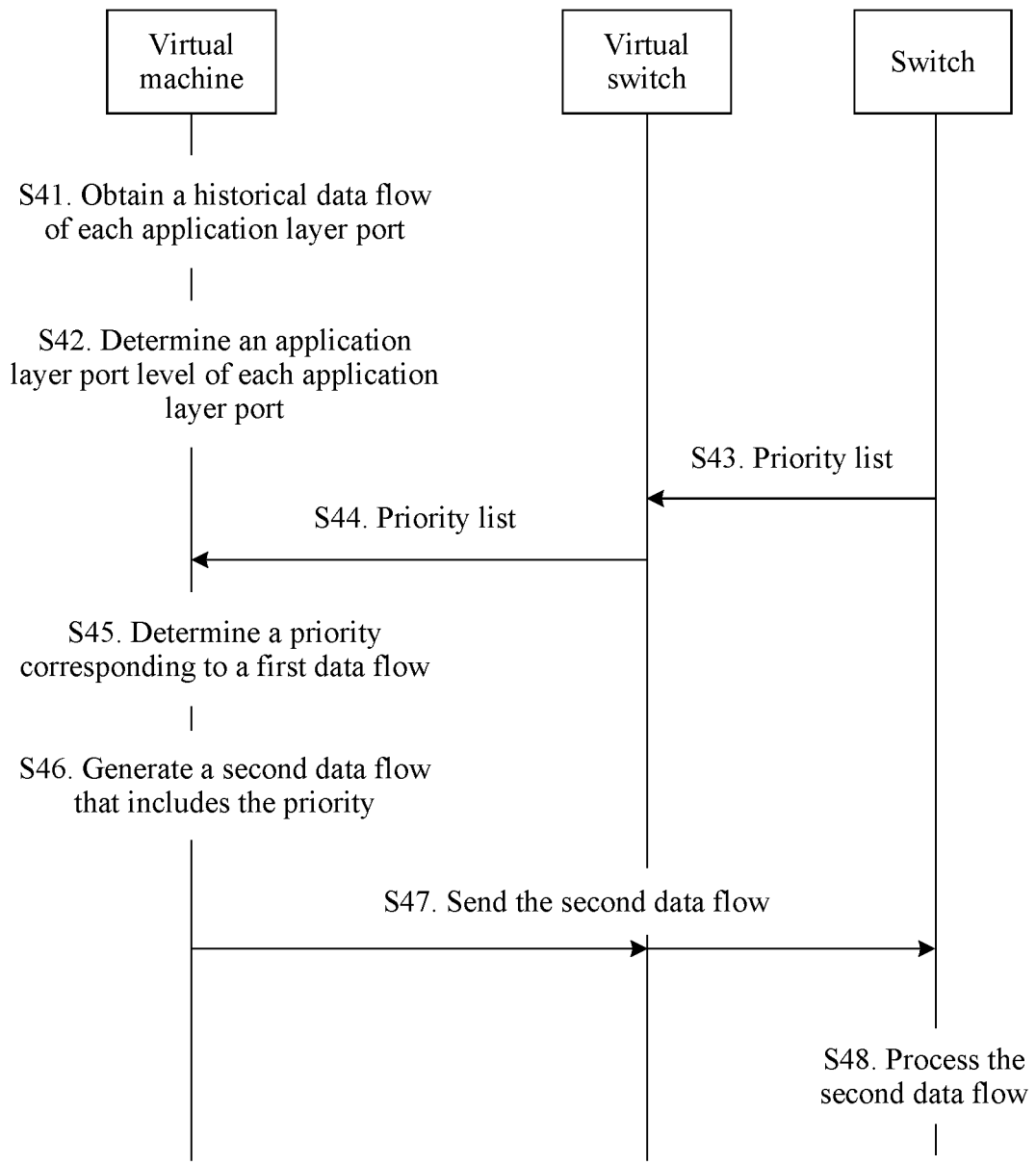
FIG. 9 is a signaling diagram 4 of a data flow processing method according to an embodiment of this application.

FIG. 9 is a signaling diagram 4 of a data flow processing method according to an embodiment of this application. FIG. 9 is used to perform the procedure in the virtualization scenario in the another data flow processing method provided in FIG. 7. As shown in FIG. 9, the method includes the following steps.

S41. A virtual machine obtains a historical data flow that is corresponding to each application layer port and that is recorded by the virtual machine.

S42. The virtual machine determines, based on the historical data flow corresponding to each application layer port, a priority corresponding to the application layer port, and generates a priority correspondence table.

S43. A switch sends a priority list to a virtual switch by using a network adapter, where the priority list includes priority values respectively corresponding to different priorities in a one-to-one corresponding manner and supported by the switch.

S43 specifically includes the following: The switch sends an extended LLDP packet to the virtual switch by using the network adapter, where the extended LLDP packet includes an LLDPDU, the LLDPDU includes an optional TLV, the optional TLV includes an information table, and the information table includes a type identifier of the optional TLV, a name of the optional TLV, and at least two DSCP values supported by the switch, where the DSCP values are respectively corresponding to different priorities in a one-to-one corresponding manner, that is, the priority list may include the at least two DSCP values.

S44. The virtual switch sends the priority list to each virtual machine connected to the virtual switch.

S45. The virtual machine determines a priority corresponding to a first data flow to be sent to the switch.

S46. The virtual machine adds the priority to the first data flow to generate a second data flow that includes the priority.

S46 specifically includes the following:

The virtual machine determines, according to the priority list, a priority value of the priority corresponding to the application layer port; and the virtual machine adds the priority value of the priority corresponding to the application layer port to the first data flow.

S47. The virtual machine sends the second data flow to the switch by sequentially using the virtual switch and the network adapter.

S48. The switch places, according to the priority of the second data flow, the second data flow into a data queue corresponding to the priority.

For a process shown in FIG. 9, refer to the process shown in FIG. 7.

In this embodiment, the host obtains the historical data flow that is corresponding to each application layer port and that is recorded by the host. The host determines the priority of each application layer port according to the historical data flow corresponding to the application layer port, and generates the priority correspondence table. The host receives the priority list sent by the switch, and the host determines, according to the priority correspondence table, the priority value of the priority corresponding to the application layer port and the DSCP values in the priority list. The host adds the priority value of the priority corresponding to the application layer port to the first data flow corresponding to the application layer port, to generate the second data flow that includes the priority. The host sends the second data flow to the switch, so that the switch processes the second data flow according to the priority in the second data flow. The server or the virtual machine analyzes the historical data flow of each application layer port to determine the priority of each application layer port. Therefore, before the server or the virtual machine sends the first data flow from the application layer port to the switch, the server or the virtual machine allocates the priority to the first data flow, so that the switch does not need to collect flow-based statistics about packets to determine whether the first data flow is an elephant flow or a mouse flow, thereby saving hardware resources of the switch. In addition, the switch sends the priority list to the server or the virtual machine. The server or the virtual machine may configure different priority values for data flows from different application layer ports according to the priority list. Then, the server or the virtual machine sends the second data flow configured with the priority value to the switch, and the switch places the second data flow into the data queue corresponding to the priority value according to the priority value in the second data flow. Therefore, after the switch receives the second data flow configured with the priority value, the switch may process, for example, transmit or discard, the data flow in a priority order represented by the priority value in the second data flow, and the switch does not need to determine the priority of the data flow, thereby preventing the elephant flow from occupying bandwidth of the mouse flow, and processing data flows in a timely manner.

Figure 10:
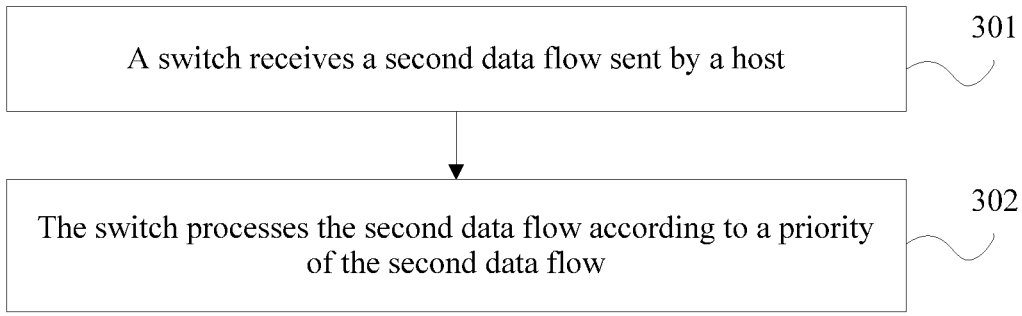
FIG. 10 is a schematic flowchart of another data flow processing method according to an embodiment of this application.

FIG. 10 is a schematic flowchart of another data flow processing method according to an embodiment of this application. As shown in FIG. 10, the method includes the following steps.

S301. A switch receives a second data flow sent by a host, where the second data flow is generated after the host determines a priority corresponding to a first data flow to be sent to the switch and adds the priority to the first data flow.

S302. The switch processes the second data flow according to the priority of the second data flow.

For a process of this embodiment, refer to the processes in FIG. 4 to FIG. 6.

In this embodiment, the switch receives the second data flow sent by the host, where the second data flow is generated after the host determines the priority corresponding to the first data flow to be sent to the switch and adds the priority to the first data flow. The switch processes the second data flow according to the priority of the second data flow. The host is a server in a non-virtualization scenario, and the host is a virtual machine in a virtualization scenario. Therefore, before the server or the virtual machine sends a data flow to the switch, the server or the virtual machine assigns a priority to the data flow, so that the switch does not need to collect flow-based statistics about packets to determine whether the data flow is an elephant flow or a mouse flow, and hardware resources of the switch can be saved. In addition, because the server or the virtual machine sends the data flow configured with the priority to the switch, the switch may directly process, for example, transmit or discard, the data flow in a priority order represented by the priority in the data flow, and then the switch does not need to determine the priority of the data flow, thereby preventing the elephant flow from occupying bandwidth of the mouse flow.

Figure 11:
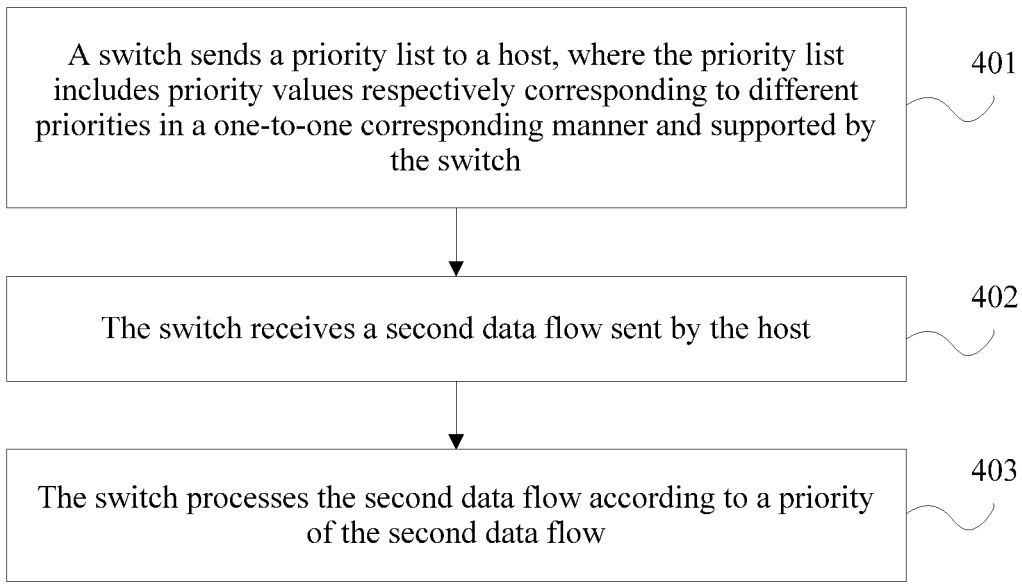
FIG. 11 is a schematic flowchart of still another data flow processing method according to an embodiment of this application.

FIG. 11 is a schematic flowchart of still another data flow processing method according to an embodiment of this application. As shown in FIG. 11, the method includes the following steps.

S401. A switch sends a priority list to a host, where the priority list includes priority values respectively corresponding to different priorities in a one-to-one corresponding manner and supported by the switch.

S401 specifically includes the following: The switch sends an extended LLDP packet to the host, where the extended LLDP packet includes an LLDPDU, the LLDPDU includes an optional TLV, the optional TLV includes an information table, and the information table includes a type identifier of the optional TLV, a name of the optional TLV, and at least two DSCP values supported by the switch, where the DSCP values are respectively corresponding to different priorities in a one-to-one corresponding manner, that is, the priority list may include the at least two DSCP values.

S402. The switch receives a second data flow sent by the host, where the second data flow is generated after the host determines a priority corresponding to a first data flow to be sent to the switch and adds the priority to the first data flow.

S403. The switch processes the second data flow according to the priority of the second data flow.

S403 specifically includes the following: The switch places, according to the priority of the second data flow, the second data flow into a data queue corresponding to the priority.

For a process and a beneficial effect of this embodiment, refer to descriptions in FIG. 7 to FIG. 9.

Figure 12:
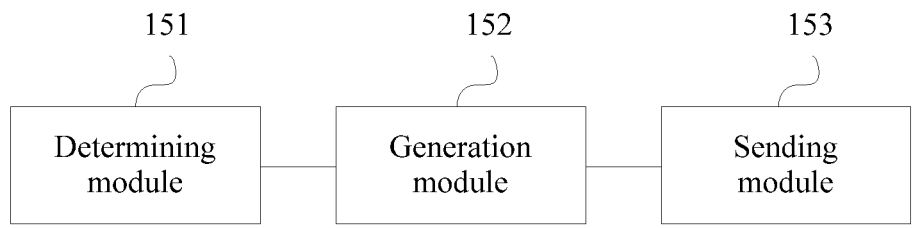
FIG. 12 is a schematic structural diagram of a host according to an embodiment of this application.

FIG. 12 is a schematic structural diagram of a host according to an embodiment of this application. As shown in FIG. 12, the host includes: a determining module 151, configured to determine a priority corresponding to a first data flow to be sent to a switch; a generation module 152, configured to add the priority to the first data flow to generate a second data flow that includes the priority; and a sending module 153, configured to send the second data flow to the switch, so that the switch processes the second data flow according to the priority of the second data flow.

The determining module 151 may perform step S101 of the method shown in FIG. 4, step S11 of the method shown in FIG. 5, and step S21 of the method shown in FIG. 6. The generation module 152 may perform step S102 of the method shown in FIG. 4, step S12 of the method shown in FIG. 5, and step S22 of the method shown in FIG. 6. The sending module 153 may perform step S103 of the method shown in FIG. 4, step S13 and step S14 of the method shown in FIG. 5, and step S23 and step S24 of the method shown in FIG. 6.

Figure 13:
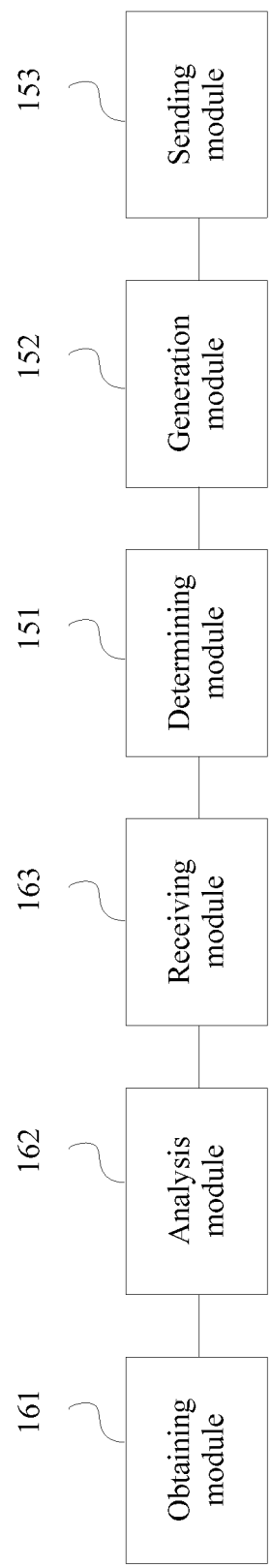
FIG. 13 is a schematic structural diagram of another host according to an embodiment of this application.

FIG. 13 is a schematic structural diagram of another host according to an embodiment of this application. Based on the host shown in FIG. 12, as shown in FIG. 13, the host further includes an obtaining module 161, an analysis module 162, and a receiving module 163.

The determining module 151 is specifically configured to: determine an application layer port corresponding to a first data flow; and determine, according to a priority correspondence table, a priority corresponding to the application layer port.

The determining module 151 may perform step S204 of the method shown in FIG. 7, the determining module 151 may perform step S34 of the method shown in FIG. 8, and the determining module 151 may perform step S45 of the method shown in FIG. 9.

The obtaining module 161 is configured to: before the determining module 151 determines a priority corresponding to a data flow to be sent to a switch, obtain a historical data flow that is corresponding to each application layer port and that is recorded by the host. The obtaining module 161 may perform step S201 of the method shown in FIG. 7, step S31 of the method shown in FIG. 8, and step S41 of the method shown in FIG. 9.

The analysis module 162 is configured to: determine, based on the historical data flow corresponding to each application layer port, a priority corresponding to the application layer port, and generate the priority correspondence table. The analysis module 162 may perform step S202 of the method shown in FIG. 7, step S32 of the method shown in FIG. 8, and step S42 of the method shown in FIG. 9.

The receiving module 163 is configured to: before the obtaining module 161 obtains the historical data flow that is corresponding to each application layer port and that is recorded by the host, receive a priority list sent by the switch, where the priority list includes priority values respectively corresponding to different priorities in a one-to-one corresponding manner and supported by the switch. The receiving module 163 may perform step S203 of the method shown in FIG. 7, step S33 of the method shown in FIG. 8, and step S43 of the method shown in FIG. 9.

Correspondingly, the generation module 152 is specifically configured to: determine, according to the priority list, a priority value of the priority corresponding to the application layer port; and add the priority value of the priority corresponding to the application layer port to the first data flow.

The generation module 152 may perform step S205 of the method shown in FIG. 7, step S35 of the method shown in FIG. 8, and step S46 of the method shown in FIG. 9.

When receiving the priority list sent by the switch, the receiving module 163 is specifically configured to: receive an extended LLDP packet sent by the switch.

The extended LLDP packet includes at least two DSCP values supported by the switch, and the DSCP values are respectively corresponding to different priorities in a one-to-one corresponding manner.

In an implementation, the analysis module 162 is specifically configured to: determine, for each application layer port, a sum of historical data flows corresponding to the application layer port; sort all application layer ports in descending order according to sizes of the sums of the data flows of all the application layer ports, to obtain an application layer port sequence; and determine that a priority corresponding to the first N application layer ports in the application layer port sequence is a first level, and determine that a priority corresponding to application layer ports in the application layer port sequence other than the first N application layer ports is a second level, where the second level is higher than the first level, and N is a positive integer.

The host in the embodiment shown in FIG. 13 may be configured to perform technical solutions of the embodiments shown in FIG. 1, FIG. 2 and FIG. 3, and FIG. 7 to FIG. 9. Implementation principles and technical effects thereof are similar and are not described herein.

Figure 14:
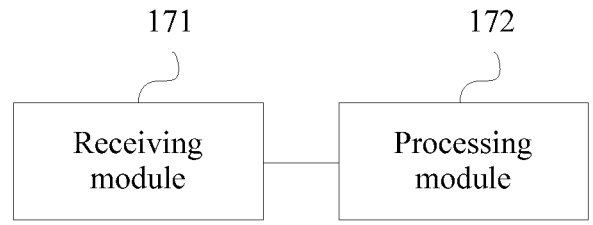
FIG. 14 is a schematic structural diagram of a switch according to an embodiment of this application.

FIG. 14 is a schematic structural diagram of a switch according to an embodiment of this application. As shown in FIG. 14, the switch includes: a receiving module 171, configured to receive a second data flow sent by a host, where the second data flow is generated after the host determines a priority corresponding to a first data flow to be sent to the switch and adds the priority to the first data flow, where the receiving module 171 may perform step S301 of the method shown in FIG. 10; and a processing module 172, configured to process the second data flow according to the priority of the second data flow, where the processing module 172 may perform step S302 of the method shown in FIG. 10.

The switch in the embodiment shown in FIG. 14 may be configured to perform a technical solution of the embodiment shown in FIG. 10. Implementation principles and technical effects thereof are similar and are not described herein.

Figure 15:
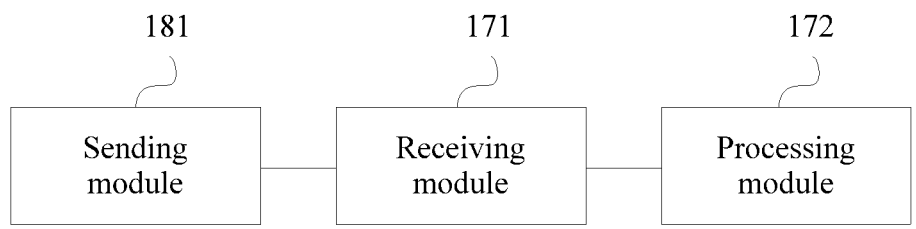
FIG. 15 is a schematic structural diagram of another switch according to an embodiment of this application.

FIG. 15 is a schematic structural diagram of another switch according to an embodiment of this application. As shown in FIG. 15, the switch further includes: a sending module 181, configured to send a priority list to a host before the receiving module 171 receives a second data flow sent by the host, where the priority list includes priority values respectively corresponding to different priorities in a one-to-one corresponding manner and supported by the switch, where the sending module 181 may perform step S401 of the method shown in FIG. 11.

When sending the priority list to the host, the sending module 181 is specifically configured to: send an extended LLDP packet to the host, where the extended LLDP packet includes at least two DSCP values supported by the switch, and the DSCP values are respectively corresponding to different priorities in a one-to-one corresponding manner.

The processing module 172 is specifically configured to: place, according to the priority of the second data flow, the second data flow into a data queue corresponding to the priority. The processing module 172 may perform step S403 of the method shown in FIG. 11.

The switch in the embodiment shown in FIG. 15 may be configured to perform a technical solution of the embodiment shown in FIG. 11. Implementation principles and technical effects thereof are similar and are not described herein.

Figure 16:
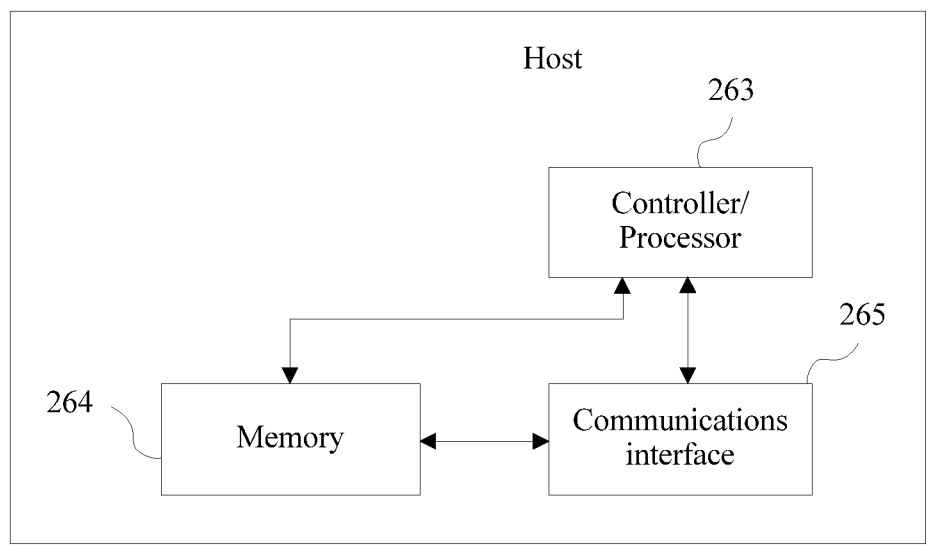
FIG. 16 is a schematic structural diagram of hardware of a host according to an embodiment of this application.

FIG. 16 is a schematic structural diagram of hardware of a host according to an embodiment of this application. As shown in FIG. 16, the host includes a processor 263 and a memory 264. The memory 264 is configured to store program code and data of the host. In addition, the host may further include a communications interface 265. The communications interface 265 is configured to support communication between the host and another network entity. The processor 263 is configured to execute the program code in the memory 264 to implement the following functions.

The processor 263 is configured to: determine a priority corresponding to a first data flow to be sent to a switch; add the priority to the first data flow to generate a second data flow that includes the priority; and send the second data flow to the switch, so that the switch processes the second data flow according to the priority of the second data flow. In this case, the processor 263 may implement functions of the determining module 151, the generation module 152, and the sending module 153 in the host shown in FIG. 12. Further, the processor 263 may perform step S101, step S102, and step S103 of the method shown in FIG. 4.

Further, the processor 263 is specifically configured to: determine an application layer port corresponding to the first data flow; and determine, according to a priority correspondence table, a priority corresponding to the application layer port. In this case, the processor 263 may implement a function of the determining module 151 in the host shown in FIG. 13. Further, the processor 263 may perform step S204 of the method shown in FIG. 7.

Further, the processor 263 is specifically configured to: before determining the priority corresponding to the first data flow to be sent to the switch, obtain a historical data flow that is corresponding to each application layer port and that is recorded by the host; and determine, based on the historical data flow corresponding to each application layer port, a priority corresponding to the application layer port, and generate the priority correspondence table. In this case, the processor 263 may implement a function of the obtaining module 161 in the host shown in FIG. 13. Further, the processor 263 may perform step S201 of the method shown in FIG. 7.

Further, the processor 263 is specifically configured to: before obtaining the historical data flow that is corresponding to each application layer port and that is recorded by the host, receive a priority list sent by the switch, where the priority list includes priority values respectively corresponding to different priorities in a one-to-one corresponding manner. Correspondingly, the processor 263 is specifically configured to: determine, according to the priority list, a priority value of the priority corresponding to the application layer port; and add the priority value of the priority corresponding to the application layer port to the first data flow. In this case, the processor 263 may implement functions of the receiving module 163 and the generation module 152 in the host shown in FIG. 13. Further, the processor 263 may perform step S203 and step S205 of the method shown in FIG. 7.

Further, the processor 263 is specifically configured to receive an extended LLDP packet sent by the switch, where the extended LLDP packet includes at least two DSCP values supported by the switch, and the DSCP values are respectively corresponding to different priorities in a one-to-one corresponding manner.

Further, the processor 263 is specifically configured to: determine, for each application layer port, a sum of historical data flows corresponding to the application layer port; sort all application layer ports in descending order according to sizes of the sums of the data flows of all the application layer ports, to obtain an application layer port sequence; and determine that a priority corresponding to the first N application layer ports in the application layer port sequence is a first level, and determine that a priority corresponding to application layer ports in the application layer port sequence other than the first N application layer ports is a second level, where the second level is higher than the first level, and N is a positive integer. In this case, the processor 263 may implement a function of the analysis module 162 in the host shown in FIG. 13.

The host in the embodiment shown in FIG. 16 may be configured to: execute the technical solutions of the foregoing method embodiments, or execute programs of the modules in the embodiments shown in FIG. 12 and FIG. 13. The processor 263 invokes the programs to execute operations of the method embodiments, so as to implement the modules shown in FIG. 12 and FIG. 13.

Alternatively, the processor 263 may be a controller, and is represented as a "controller/processor 263" in FIG. 16. The processor 263 performs various functions used to communicate with the switch.

Alternatively, the processor 263, such as a central processing unit (CPU), may be configured as one or more integrated circuits that perform the foregoing methods, for example, one or more application-specific integrated circuits (ASIC), one or more digital signal processors (DSP), one or more field-programmable gate arrays (FPGA), or the like. The memory 264 may be one memory, or may be a general term for a plurality of storage elements.

Figure 17:
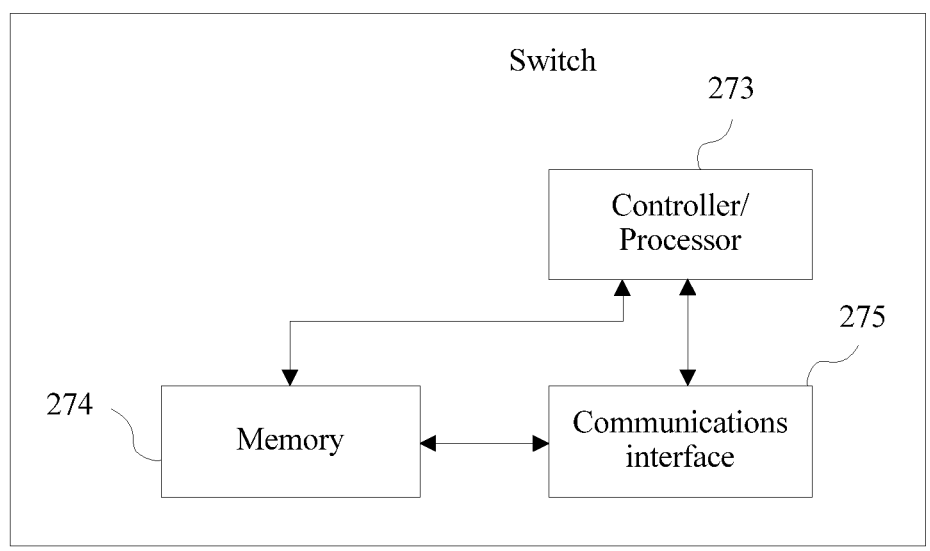
FIG. 17 is a schematic structural diagram of hardware of a switch according to an embodiment of this application.

FIG. 17 is a schematic structural diagram of hardware of a switch according to an embodiment of this application. As shown in FIG. 17, the switch includes a processor 273 and a memory 274. The memory 274 is configured to store program code and data of the switch. In addition, the switch may further include a communications interface 275. The communications interface 275 is configured to support communication between the switch and another network entity. The processor 273 is configured to execute the program code in the memory 274 to implement the following functions.

The processor 273 is configured to: receive a second data flow sent by a host, where the second data flow is generated after the host determines a priority corresponding to a first data flow to be sent to the switch and adds the priority to the first data flow; and process the second data flow according to the priority of the second data flow. In this case, the processor 273 may implement functions of the receiving module 171 and the processing module 172 in the switch shown in FIG. 14. Further, the processor 273 may perform step S301 and step S302 of the method shown in FIG. 10.

Further, the processor 273 is specifically configured to send a priority list to the host before receiving the second data flow sent by the host, where the priority list includes priority values respectively corresponding to different priorities in a one-to-one corresponding manner. In this case, the processor 273 may implement a function of the sending module 181 in the switch shown in FIG. 15, and further, the processor 273 may perform step S401 of the method shown in FIG. 11.

Further, the processor 273 is specifically configured to send an extended LLDP packet to the host, where the extended LLDP packet includes at least two DSCP values supported by the switch, and the DSCP values are respectively corresponding to different priorities in a one-to-one corresponding manner.

Further, the processor 273 is specifically configured to place, according to the priority of the second data flow, the second data flow into a data queue corresponding to the priority. In this case, the processor 273 may implement a function of the processing module 172 in the switch shown in FIG. 15, and further, the processor 273 may perform step S403 of the method shown in FIG. 11.

The switch in the embodiment shown in FIG. 17 may be configured to: execute the technical solutions of the foregoing method embodiments, or execute programs of the modules in the embodiments shown in FIG. 14 and FIG. 15. The processor 273 invokes the programs to execute operations of the method embodiments, so as to implement the modules shown in FIG. 14 and FIG. 15.

Alternatively, the processor 273 may be a controller, and is represented as a "controller/processor 273" in FIG. 17. The processor 273 performs various functions used to communicate with the host.

The processor 273, such as a CPU, may be alternatively configured as one or more integrated circuits that implement the foregoing methods. The memory 274 may be one memory, or may be a general term for a plurality of storage elements.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or a wireless (for example, infrared, radio, or microwave) manner. The computer-readable storage medium may be any usable medium accessible to a computer, or a data storage device, such as a server or a data center, integrating one or more usable media.

What is claimed is:

1. A data flow processing method, comprising:
   receiving, by a host, a priority list from a switch, wherein the priority list comprises priority values respectively corresponding to different priorities in a one-to-one corresponding manner;
   determining, by the host according to the priority list, a priority value of a priority corresponding to an application layer port corresponding to a first data flow to be sent to the switch;
   adding, by the host, the priority value of the priority corresponding to the application layer port to the first data flow to generate a second data flow that comprises the priority; and
   sending, by the host, the second data flow to the switch, so that the switch processes the second data flow according to the priority of the second data flow.

2. The method according to claim 1, wherein determining the priority corresponding to the first data flow to be sent to the switch comprises determining, by the host according to a priority correspondence table, the priority corresponding to the application layer port.

3. The method according to claim 2, wherein before determining the priority corresponding to the first data flow to be sent to the switch, the method further comprises:
   obtaining, by the host, a historical data flow that is corresponding to each application layer port and that is recorded by the host; and
   determining, by the host based on the historical data flow corresponding to the application layer port, a priority corresponding to each application layer port, and generating the priority correspondence table.

4. The method according to claim 1, wherein receiving the priority list from the switch comprises: receiving, by the host, an extended Link Layer Discovery Protocol (LLDP) packet from the switch, wherein the extended LLDP packet comprises at least two differentiated service code point (DSCP) values supported by the switch, and the at least two DSCP values are respectively corresponding to different priorities in a one-to-one corresponding manner.

5. The method according to claim 3, wherein determining the priority corresponding to each application layer port based on the historical data flow corresponding to the application layer port comprises:
   determining, by the host for each application layer port, a sum of historical data flows corresponding to the application layer port;
   sorting, by the host, all application layer ports in descending order according to sizes of the sums of the historical data flows of all the application layer ports, to obtain an application layer port sequence; and
   determining, by the host, that a priority corresponding to the first N application layer ports in the application layer port sequence is a first level, and determining that a priority corresponding to application layer ports in the application layer port sequence other than the first N application layer ports is a second level, wherein the second level is higher than the first level, and N is a positive integer.

6. A data flow processing method, comprising:
   sending, by a switch, a priority list to a host, wherein the priority list comprises priority values respectively corresponding to different priorities in a one-to-one corresponding manner and supported by the switch;

receiving, by the switch, a second data flow from the host, wherein the second data flow is generated after the host determines a priority corresponding to a first data flow to be sent to the switch and adds the priority to the first data flow; and processing, by the switch, the second data flow according to the priority of the second data flow.

7. The method according to claim 6, wherein sending the priority list to the host comprises: sending, by the switch, an extended Link Layer Discovery Protocol (LLDP) packet to the host, wherein the extended LLDP packet comprises at least two differentiated service code point (DSCP) values supported by the switch, and the at least two DSCP values are respectively corresponding to different priorities in a one-to-one corresponding manner.

8. The method according to claim 6, wherein processing the second data flow according to the priority of the second data flow comprises: placing, by the switch according to the priority of the second data flow, the second data flow into a data queue corresponding to the priority.

9. A host, comprising a memory and a processor;
the memory stores instructions;
the processor is configured to execute the instructions to:
receive a priority list from a switch, wherein the priority list comprises priority values respectively corresponding to different priorities in a one-to-one corresponding manner;
determine, according to the priority list, a priority value of a priority corresponding to an application layer port corresponding to a first data flow to be sent to the switch;
add the priority value of the priority corresponding to the application layer port to the first data flow to generate a second data flow that comprises the priority; and
send the second data flow to the switch, so that the switch processes the second data flow according to the priority of the second data flow.

10. The host according to claim 9, wherein the processor is configured to execute the instructions to determine, according to a priority correspondence table, the priority corresponding to the application layer port.

11. The host according to claim 10, wherein the processor is configured to execute the instructions to:
before determining the priority corresponding to the first data flow to be sent to the switch, obtain a historical data flow that is corresponding to each application layer port and that is recorded by the host; and
determine, based on the historical data flow corresponding to each application layer port, a priority corresponding to the application layer port, and generate the priority correspondence table.

12. The host according to claim 9, wherein the processor is configured to execute the instructions to:
receive an extended Link Layer Discovery Protocol (LLDP) packet from the switch, wherein the extended LLDP packet comprises at least two differentiated service code point (DSCP) values supported by the switch, and the at least two DSCP values are respectively corresponding to different priorities in a one-to-one corresponding manner.

13. The host according to claim 11, wherein the processor is configured to execute the instructions to:
determine, for each application layer port, a sum of historical data flows corresponding to the application layer port;
sort all application layer ports in descending order according to sizes of the sums of the historical data flows of all the application layer ports, to obtain an application layer port sequence; and
determine that a priority corresponding to the first N application layer ports in the application layer port sequence is a first level, and determine that a priority corresponding to application layer ports in the application layer port sequence other than the first N application layer ports is a second level, wherein the second level is higher than the first level, and N is a positive integer.

14. A switch, comprising a memory and a processor;
the memory stores instructions;
the processor is configured to execute the instructions to:
send a priority list to a host, wherein the priority list comprises priority values respectively corresponding to different priorities in a one-to-one corresponding manner and supported by the switch;
receive a second data flow from the host, wherein the second data flow is generated after the host determines a priority corresponding to a first data flow to be sent to the switch and adds the priority to the first data flow; and
process the second data flow according to the priority of the second data flow.

15. The switch according to claim 14, wherein the processor is configured to execute the instructions to:
send an extended Link Layer Discovery Protocol (LLDP) packet to the host, wherein the extended LLDP packet comprises at least two differentiated service code point (DSCP) values supported by the switch, and the at least two DSCP values are respectively corresponding to different priorities in a one-to-one corresponding manner.

16. The switch according to claim 14, wherein the processor is configured to execute the instructions to: place, according to the priority of the second data flow, the second data flow into a data queue corresponding to the priority.

17. The method according to claim 4, wherein the LLDP packet includes a type/length/value (TLV) element including an information table containing the at least two DCSP values.

18. The method according to claim 7, wherein the LLDP packet includes a type/length/value (TLV) element including an information table containing the at least two DCSP values.

19. The host according to claim 12, wherein the LLDP packet includes a type/length/value (TLV) element including an information table containing the at least two DCSP values.

20. The switch according to claim 15, wherein the LLDP packet includes a type/length/value (TLV) element including an information table containing the at least two DCSP values.

* * * * *